United States Patent
Ishikawa

[19]

[11] Patent Number: 5,907,450
[45] Date of Patent: May 25, 1999

[54] PRE-READ LEARNING DIGITAL SERVO-CONTROL DEVICE

[75] Inventor: Jun Ishikawa, Tokyo, Japan

[73] Assignee: NEC Corporation, Tokyo, Japan

[21] Appl. No.: 08/755,907

[22] Filed: Nov. 25, 1996

[30] Foreign Application Priority Data

Nov. 24, 1995 [JP] Japan ..................................... 7-305348

[51] Int. Cl.⁶ ................................................. B65G 37/00
[52] U.S. Cl. ..................................... 360/78.09; 360/78.09; 360/78.07; 360/78.06; 318/560
[58] Field of Search ............................. 360/77.07, 77.11, 360/78.06, 78.07, 78.08, 78.09; 318/560; 369/44.28, 44.29, 44.34, 44.25, 32

[56] References Cited

U.S. PATENT DOCUMENTS 5,164,931 11/1992 Yamaguchi et al. .................. 369/44.29
5,550,685 8/1996 Drouin .................................. 360/77.08

FOREIGN PATENT DOCUMENTS 3-288913 12/1991 Japan .
4-335272 11/1992 Japan .
2500734 1/1993 Japan .

OTHER PUBLICATIONS

W. Messner et al., "Using Zero Placement and Root Locus Techniques to Design Robust Discrete–Time Repetitive Controllers", 3rd International Workshop on Advanced Motion Control, Mar. 20–23, 1994, pp. 761–770.

*Primary Examiner*—Aristotelis M. Psitos
*Assistant Examiner*—Joseph M. Vann
*Attorney, Agent, or Firm*—Foley & Lardner

[57] ABSTRACT

A pre-read learning digital servo-control device has a digital servo-control device for controlling the speed and/or position of a controlled object. A corrective control input for a (n+1)-th trial for state control is based on errors observed in the n-th trial. The corrective control input is applied at m sample time(s) before the time when a subsequent error is observed, where m is an integer greater than or equal to one for a sampling time of the digital servo-control device.

6 Claims, 5 Drawing Sheets

PRE-READ LEARNING DIGITAL SERVO-CONTROL DEVICE

FIELD OF THE INVENTION

This invention relates to a digital servo-control device, and more particularly to, a digital servo-control device such as a magnetic disk device in which high-speed positioning is required.

BACKGROUND OF THE INVENTION

In conventional positioning devices, for example, head positioning devices in magnetic disk devices, there is a problem that it is difficult to perform high-speed positioning with a common characteristic to all target positions and in all kinds of devices since a transient response in settling a head position is disturbed by various reasons: 1) a conversion gain (torque constant) from control input to torque generation varies with time due to heating of a motor used for positioning control; 2) a torque constant varies depending on a place to be positioned, i.e., an outer track, center track or inner track of a disk; 3) a production error occurs in fabrication of disk devices etc. Meanwhile, recently, generally employed in magnetic disk devices is the so-called 'sector servo scheme' in which a head position detection signal is written on each disk surface. The head position is controlled using a digital servo based on the detected signal. The proportion of the number of head position detection signals is however decreased due to a demand for increase in data capacity. Therefore, the sampling rate of digital servo-control devices trends to be reduced. Thus, the above problem becomes vary serious.

Various methods to solve such problem have been suggested. A simplest and typical method is to widen a feedback servo control band as long as possible. In the other methods, the internal state of a digital servo device is reset to reduce an overshoot or undershoot when settling starts in positioning the control system (see, e.g., Japanese patent application laid-open Nos. 3-288913, 4-335272), a corrective control input is learned and renewed depending on a speed follow-up error to enhance the accuracy of following-up to a reference speed track to improve the transient characteristic in speed control system (see, e.g., Japanese patent application laid-open No. 5-16941).

However, in the conventional sector servo manner magnetic disk device, it is difficult to widen the feedback servo control band since the sampling time of the servo system cannot be shortened. Thus, it is substantially impossible to perform high-speed positioning with a common characteristic to all target positions and in all kinds of devices.

In the method wherein the internal state of a digital servo device is reset to reduce overshoot or undershoot when settling starts in positioning the control system, it is necessary to know in advance the characteristic (model) of the controlled system. Thus, when all actual controlled system is varied with time, it cannot normally operate except unless an additional operation such as determining the characteristic again is conducted.

In the method of applying learning control to speed control, since digital control is not considered and the renewal of the corrective learning input is simultaneously conducted with the output of the trial at the next time, there is a problem that an excessive spike-shaped learning input result occurs when the sampling time is lengthened. In particular, this problem is significant in positioning control system. Therefore, the conventional devices that the renewal of corrective learning input is simultaneously conducted with the output of the trial at the next time, even if the sampling time is short, cannot be applied to positioning control.

SUMMARY OF THE INVENTION

Accordingly, it is an object of the invention to provide a digital servo-control device which can perform high-speed positioning with a common characteristic to all target positions and in all kinds of devices to adapt to the dispersion characteristics in controlled systems and variations with time even when the sampling time is long and the control band of the feedback servo is narrow.

According to the invention, a pre-read learning digital servo-control device, comprises:

a digital servo-control means;

wherein based on a follow-up error observed in a n-th trial for state control, in a (n+1)-th trial for state control, a corrective control input which is to be applied at m sample time, in which m is one or more, before the time when the follow-up error is observed on the basis of a sampling time of the digital servo-control means is renewed.

According to another aspect of the invention, a pre-read learning digital servo-control device, comprises:

a digital servo-control means for positioning;

a reference position track generating means which generates a reference position track to be followed up by a position of a controlled system by referring to a table value previously stored or by calculating a mathematical model on real time, a servo compensating means which makes the position of the controlled system follow up the reference position track to stabilize the controlled system;

a pre-read learning means in which based on a position error between the reference position track and the position of the controlled system observed in a n-th trial for positioning, in a (n+1)-th trial for positioning, a corrective control input which is to be applied at m sample time, in which m is one or more, before the time when the position error is observed on the basis of a sampling time of the digital servo-control means is renewed; and a corrective control input storage and output means which stores the corrective control input renewed by the pre-read learning means, and which outputs the renewed corrective control input to the controlled system at m sample time before the corresponding time when the position error is stored in the (n+1)-th trial for positioning.

According to further aspect of the invention, a pre-read learning digital servo-control device, comprises:

a digital servo-control means for speed control;

a reference speed track generating means which generates a reference speed track to be followed up by a speed of a controlled system by referring to a table value previously stored or by calculating a mathematical model on real time, a servo compensating means which makes the speed of the controlled system follow up the reference speed track to stabilize the controlled system;

a pre-read learning means in which based on a speed error between the reference speed track and the speed of the controlled system observed in a n-th trial for speed control, in a (n+1)-th trial for speed control, a corrective control input which is to be applied at m sample time, in which m is one or more, before the time when the speed error is observed on the basis of a sampling time of the digital servo-control means is renewed; and a corrective control input storage and output means which stores the corrective control input renewed by the pre-read learning means, and which outputs the renewed corrective control input to the controlled system at m sample time before the corresponding time when the speed error is stored in the (n+1)-th trial for speed control.

As defined above, on one hand, the invention provides a positioning control device in which a digital servo device is used as a positioning system. On the other hand, the invention also provides a speed control device in which a digital servo device is used as a speed control system.

In the invention, based on a state error at a timing shifted back by m sample time (m is one or more), a corrective control input is renewed. Namely, based on a position or speed error between a reference position (speed) track and a position (speed) of a controlled system, in a (n+1)th trial for positioning or speed control, a corrective control input which is to be applied before at m sample time (m is one or more) on the basis of a sampling time of the digital servo-control means is renewed, and the renewed corrective control input is stored and then is output to the controlled system at m sample time before the time when the corresponding position (speed) error is stored in the (n+1)th trial for positioning (speed control).

BRIEF DESCRIPTION OF THE DRAWINGS

The invention will be explained in more detail in conjunction with the appended drawings, wherein.

DESCRIPTION OF THE PREFERRED EMBODIMENTS

A pre-read learning digital servo-control device in the first preferred embodiment according to the invention (which corresponds to the appended claim 2) will be explained in FIG. 1. Hereinafter, 'next time', 'this time' and 'last time' mean the order of positioning trials to be repeated. It should be noted that one positioning is completed during one trial and learning steps k(k=0 to n) are renewed in each trial.

Figure 1:
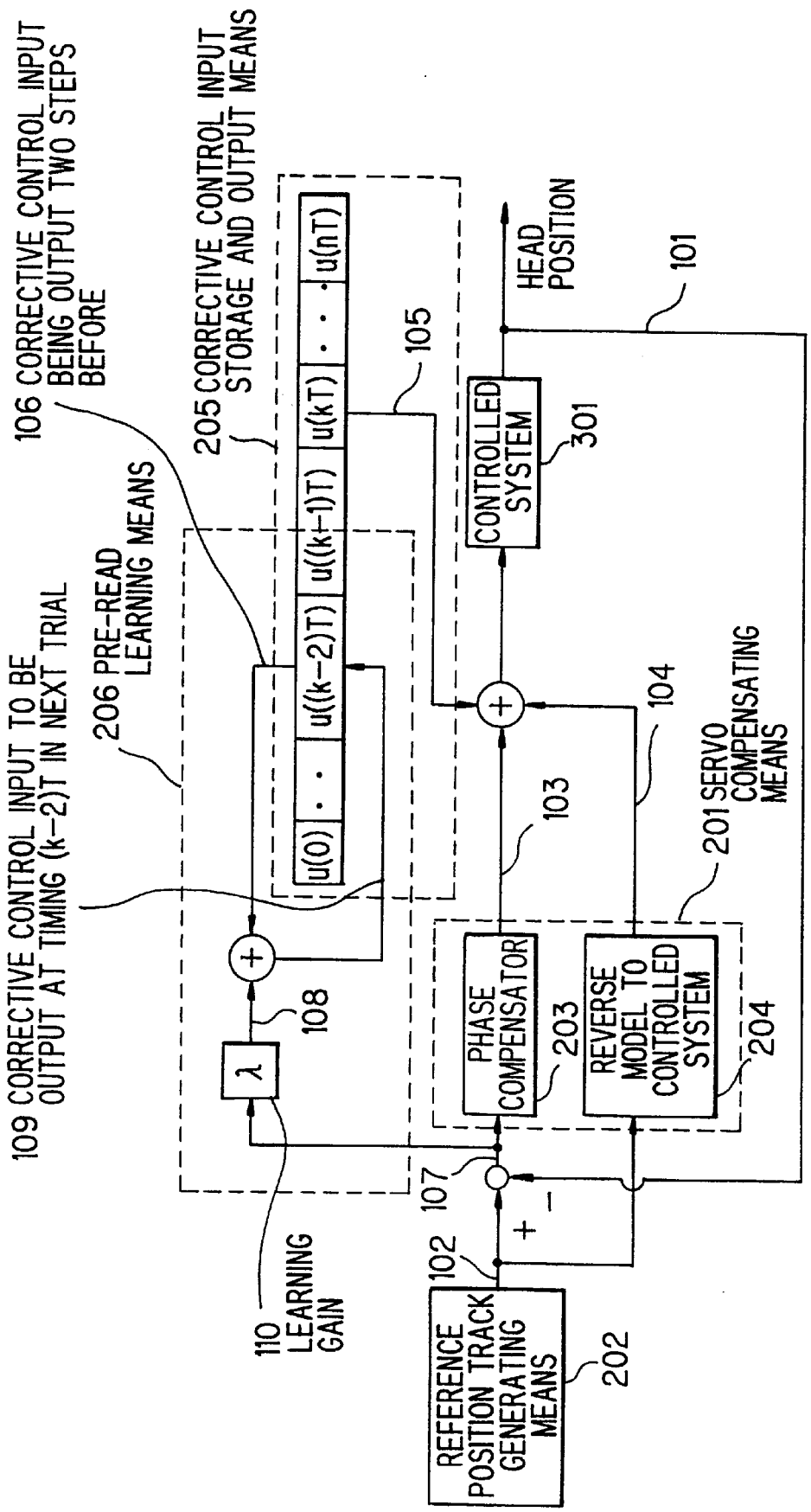
FIG. 1 is a block diagram showing a pre-read learning digital servo-control device in a first preferred embodiment according to the invention.

FIG. 1 shows an example of magnetic disk device in the first embodiment, where the number of steps m to be pre-read is two. Also, FIG. 1 illustrates an operation thereof at time kT(k=0,1,2, . . . n), where the sampling time in the digital control system is T.

A head position P(kT)101 where a controlled system 301 is located is stabilized by controlling it in such a manner as to follow a reference position track Pr(kT)102 generated by a reference position track generating means 202 within a controllable band of a servo compensating means 201 (in this case, the control band is sufficient for statical positioning, but it is not sufficient to control a transient characteristic in positioning with a common characteristic). For example, the servo compensating means 201 used herein comprises a phase compensator 203 for generating a feedback correcting signal 103 and a reverse model 204 to the controlled system which generates a feedforward signal 104 based on the reference position track Pr(kT)102.

A corrective control input storage and output means 205 outputs a corrective control input u(kT)105 which is renewed in a trial at the last time and is stored therein, as well as adding it to the feedback correcting signal 103 and feedforward signal 104, to the controlled system 301. On the other hand, to prepare for a positioning trial at the next time, a pre-read learning means 206 extracts a corrective control input u((k−2)T)106 which has already been output two steps before from the corrective control input storage and output means 205, and then it adds the corrective control input u((k−2)T)106 to a result 108 which is obtained by multiplying the position error e(kT)107 between the head position P(kT)101 observed at this time and the reference position track Pr(kT)102 by a constant learning gain λ110. Then, the added result is stored as a corrective control input u((k−2)T)109 to be output at a timing (k−2)T in a trial at the next time into the corrective control input storage and output means 205. As seen from the above explanation, in two sample times of k=0,1, the output of corrective control input is conducted, but the renewal operation is not conducted since the corrective control input u((k−2)T)106 to be renewed does not exist at the sample times k=0 and k=1.

By repeating such positioning trials, to match with the characteristic of the controlled system 301 while the learning is repeated, the position error e(kT)107 between the head position P(kT)101 and the reference position track Pr(kT)102 can approach zero. In this embodiment, the position error which is intended to approach zero by the corrective control input u(kT)105 is e((k+2)T) (i.e., two steps after). Therefore, as compared with the conventional manner in which the renewal of the corrective learning input is simultaneously conducted with the output of the trial at the next time, the present method has a grace period of two sample times for the correction to take place. As a result, the occurrence of a spike-shaped corrective control input can be suppressed. Furthermore, even when the sampling time is long and the control band of feedback servo control is narrow, a high-speed positioning can be performed while providing a common characteristic to adapt to dispersion characteristics in the controlled system and the variation with time, in all kinds of devices.

Figure 2:
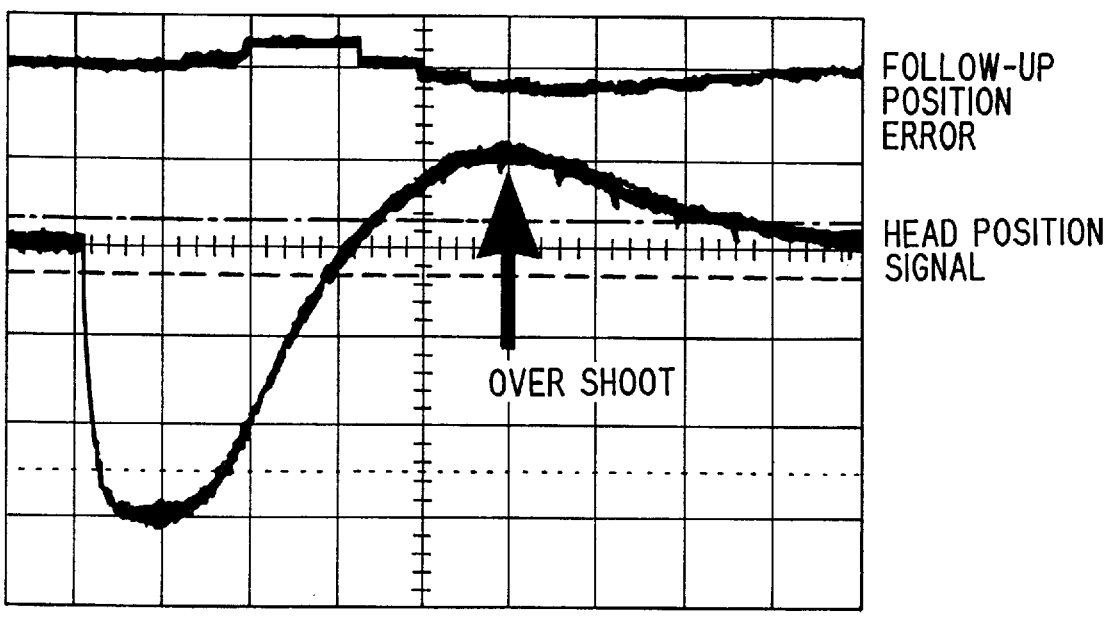
FIG. 2 shows responses of a head position and a follow-up error with time in a conventional magnetic disk device.
Figure 3:
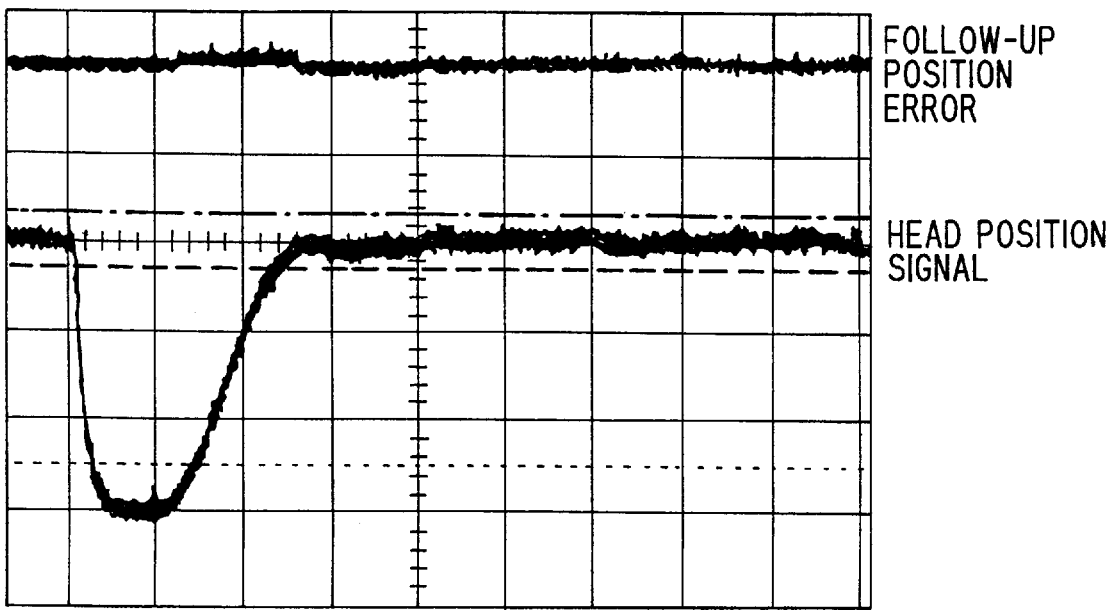
FIG. 3 shows responses of a head position and a follow-up error with time in the device in FIG. 1.

FIGS. 2 and 3 show a comparison in the case that positioning of one track width is conducted on an outermost track of the disk where the characteristic of the controlled system is highly changed. FIG. 2 shows a result in the case that positioning is conducted only by a servo compensating means which is designed to use a characteristic of the controlled system near the center of a disk as a representation value, without using a learning means. FIG. 3 shows a result in the case that the pre-read learning control according to the invention is conducted from start to end of positioning and after repeating trials for positioning 30 times to complete the learning. In the former case (FIG. 2), though the positioning near the center is well conducted, since the characteristic of the controlled system is highly varied on the outermost track of the disk, a large overshoot as shown in FIG. 2 and a lot of follow-up position errors occur, thereby impeding high-speed positioning. On the other hand, in the latter case according to the invention, after completing the learning, high-speed positioning as shown in FIG. 3 can be achieved. As such, when large dispersions occur depending on a place to be positioned, a plurality of corrective control input lines, for example, only for outermost and innermost tracks, may be stored and selectively switched depending on a place to be positioned for learning and renewal, whereby learning can be carried out using the result of learning obtained so far. Meanwhile, when a corrective control input line is used at places with different characteristics, the time required to complete learning becomes unnecessarily long since the result of learning may be highly varied when the positioning place is changed. Furthermore, the result of learning to be stored can be also used as an initial value at the start of device (as defined in the appended claims 6), thereby reducing the number of trials required to complete learning.

Figure 4:
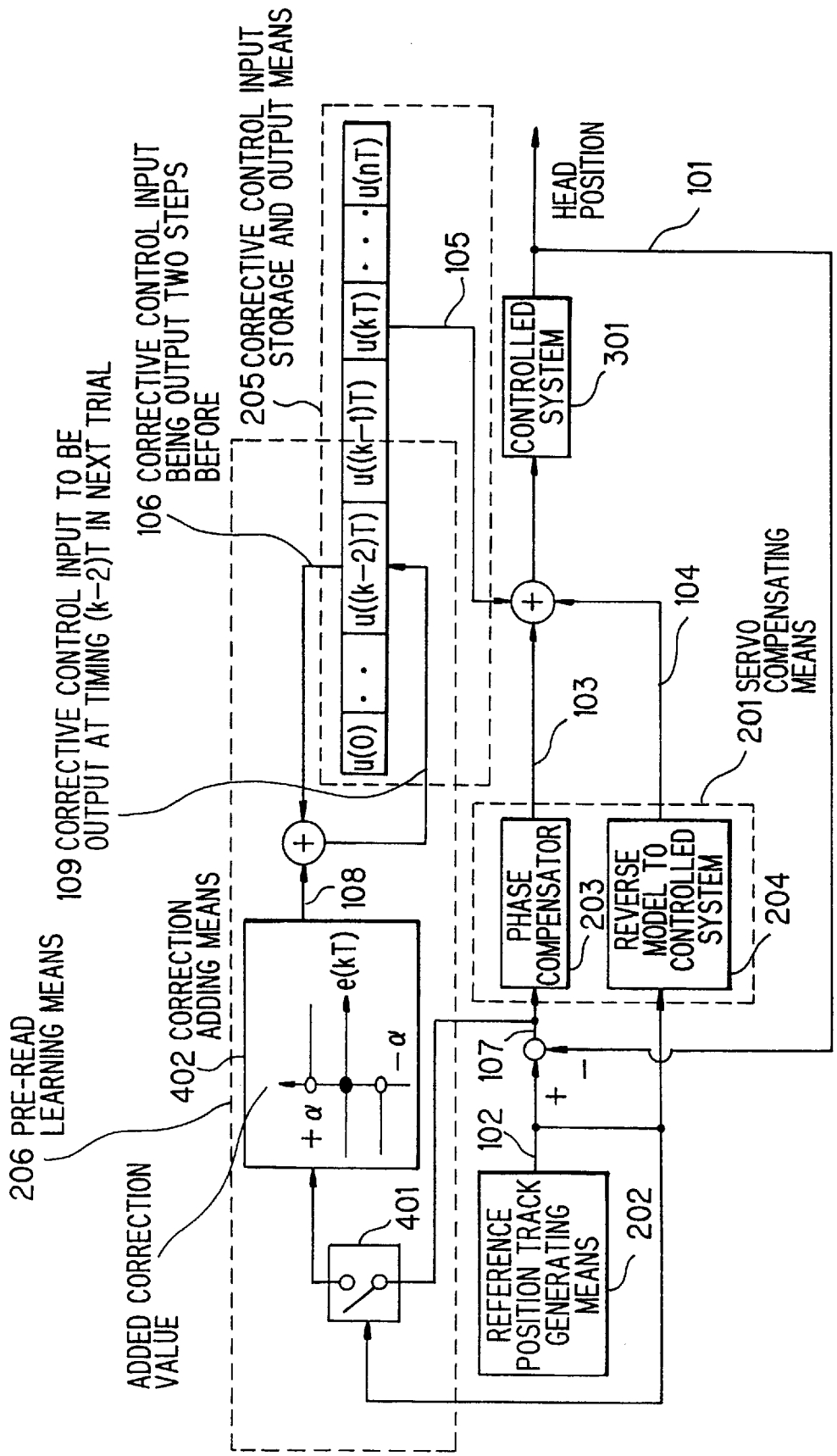
FIG. 4 is a block diagram showing a pre-read learning digital servo-control device in a second preferred embodiment according to the invention.

FIG. 4 shows a pre-read learning digital servo-control device in the second embodiment according to the invention (which corresponds to the appended claim 3), wherein a renewal manner of corrective learning input in the pre-read learning means and the period for conducting the learning are different from those in the first embodiment. FIG. 4 shows an example of magnetic disk device in the second embodiment, where the number of steps m to be pre-read is two. Also, FIG. 4 illustrates an operation thereof at time kT(k=0,1,2 . . . n), where the sampling time in the digital control system is T.

A head position P(kT)101 where a controlled system 301 is located is stabilized by controlling in such a manner as to follow a reference position track Pr(kT)102 generated by a reference position track generating means 202 within a controllable band of a servo compensating means 201 (in this case, the control band is sufficient for statical positioning, but it is not sufficient to control a transient characteristic in positioning with a common characteristic). For example, the servo compensating means 201 used herein comprises a phase compensator 203 for generating a feedback correcting signal 103 and a reverse model 204 to the controlled system which generates a feedforward signal 104 based on the reference position track Pr(kT)102. In the second embodiment, until when the reference position track Pr(kT)102 reaches ¾ track width before a final positioning target position, the head position P(kT)101 is controlled to follow the reference position track Pr(kT)102 only by the servo compensating means 202. Thereafter, when the reference position track Pr(kT)102 reaches ¾ track width before the final positioning target position, the learning step is initialized to be k=0, and a switch 401 is turned on to operate the pre-read learning means in this embodiment until the end of positioning.

After the switch 401 is turned on, a corrective control input storage and output means 205 outputs a corrective control input u(kT)105 which is renewed in a trial at the last time and is stored therein, as well as adding it to the feedback correcting signal 103 and feedforward signal 104, to the controlled system 301. On the other hand, to prepare for a positioning trial at the next time, a pre-read learning means 206 draws a corrective control input u((k−2)T)106 which is already output two steps before from the corrective control input storage and output means 205, and then a correction adding means 402 adds a correction value, which is a positive value +α if the value of a position error e(kT)107 between the head position P(kT)107 observed at this time and the reference position track Pr(kT)102 is positive, 0 if it is 0 or a negative value −α if it is negative, to the corrective control input u((k−2)T)106. Then, the added result is stored as a corrective control input u((k−2)T)109 to be output at timing (k−2)T in a trial at the next time into the corrective control input storage and output means 205. As seen from the above explanation, in two sample times of k=0,1, the output of corrective control input is conducted, but the renewal operation is not conducted since the corrective control input u((k−2)T)106 to be renewed does not exist in k=0 and k=1. In addition, since the completing speed of the learning in this embodiment increases with the increase in the value α, in one trial of positioning, a large value α is used just after the start of learning where dispersion is large and a faster completing speed of learning is required and a value α used near the end of learning is controlled to be small. Therefore, an oversensitive learning reaction can be suppressed near the end of learning where a sudden position error does not happen and a gradual change such as a variation with time can be effectively corrected.

By repeating such positioning trials, to match with the characteristic of the controlled system 301 while the learning is repeated, the position error e(kT)107 between the head position P(kT)101 and the reference position track Pr(kT) 102 can approach zero. Furthermore, since the start timing of learning is defined by the reference position track Pr(kT) 102, the dispersion in the state of the controlled system is small at the start of learning and a corrective control input to be stored can be used in common in case of different positioning distances. In this embodiment, the position error which is intended to approach zero by the corrective control input u(kT)105 is e((k+2)T) (i.e., two steps after). Therefore, as compared with the conventional manner in which the renewal of the corrective learning input is simultaneously conducted with the output of the trial at the next time, the present method has a grace period of two sample times for the correction to take place. As a result, the occurrence of a spike-shaped corrective control input can be suppressed. Furthermore, even when the sampling time is long and the control band of the feedback servo control is narrow, a high-speed positioning can be performed while providing a common characteristic to adapt to dispersion characteristics in the controlled system and the variation with time, to all target positions and in all kinds of devices.

Figure 5:
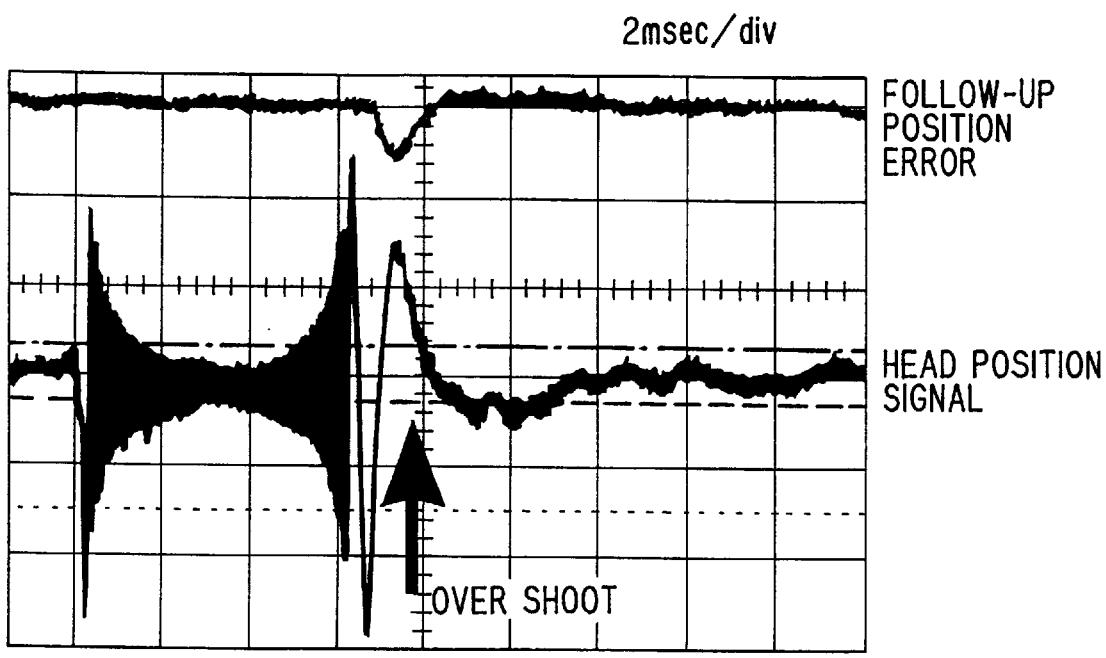
FIG. 5 shows responses of a head position and a follow-up error with time in a conventional magnetic disk device.
Figure 6:
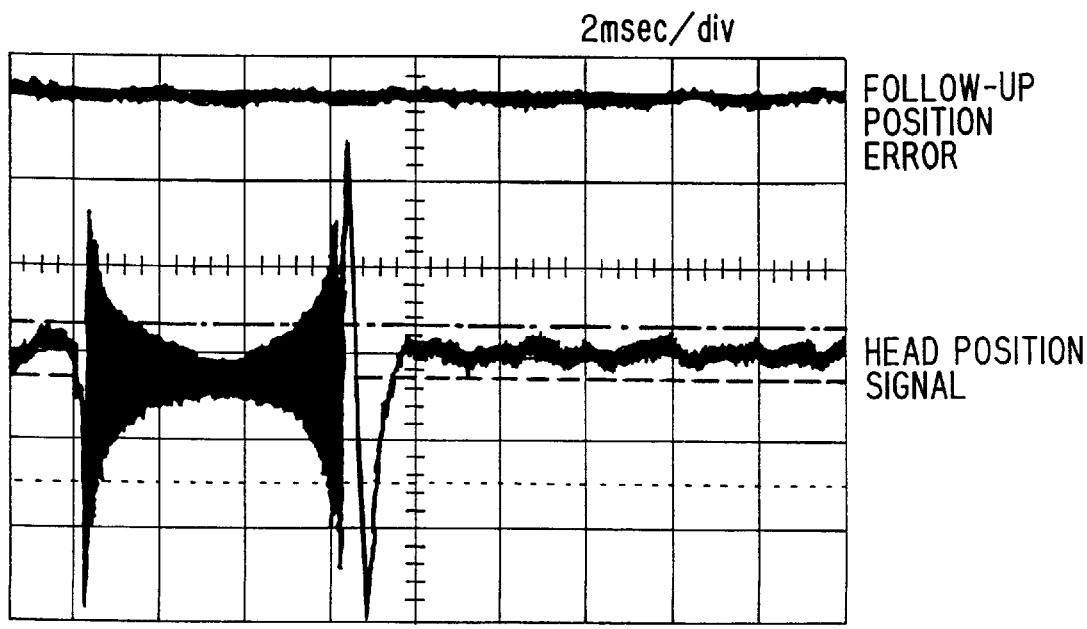
FIG. 6 shows responses of a head position and a follow-up error with time in the device in FIG. 4.

FIGS. 5 and 6 show a comparison in the case that positioning in a distance corresponding to ⅓ of all number of tracks is conducted, wherein the outermost track of the disk where the characteristic of the controlled system is highly changed is a final position to be positioned. FIG. 5 shows a result in the case that positioning is conducted only by a servo compensating means which is designed to use a characteristic of the controlled system near the center of the disk as a representation value, without using a learning means. FIG. 6 shows a result in the case that the pre-read learning control according to the invention is conducted from the time when the reference position track reaches a ¾ track width before the final position to be positioned to the time when positioning is completed and after repeating trials for positioning 20 times to complete the learning. In the former case (FIG. 5), though the positioning near at the center is well conducted, since the characteristic of the controlled system is highly varied on the outermost track of disk, a large overshoot as shown in FIG. 5 and a lot of follow-up position errors occur, thereby impeding high-speed positioning. On the other hand, in the latter case according to the invention, after completing the learning, high-speed positioning as shown in FIG. 6 can be achieved.

Figure 7:
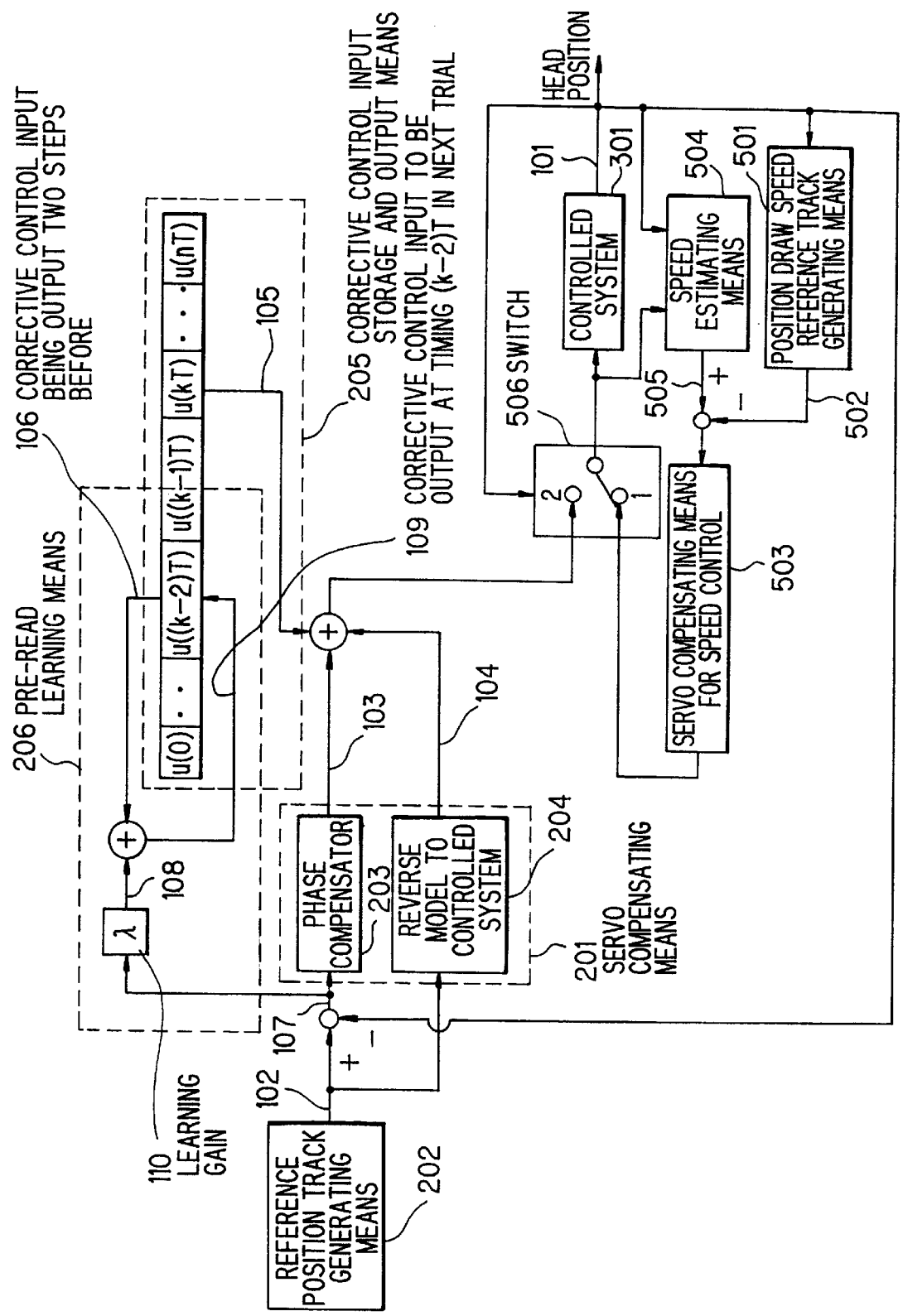
FIG. 7 is a block diagram showing a pre-read learning digital servo-control device in a third preferred embodiment according to the invention.

FIG. 7 shows a pre-read learning digital servo-control device in the third embodiment according to the invention (which corresponds to the appended claim 5), wherein a speed control servo compensating means is used until the time the pre-read learning control according to the invention is started, and a positioning control servo compensating means is used after the time the pre-read learning control is started. (The speed control servo compensating means itself is selected only as an example of means for moving the head position to a certain position and is not directly related with the invention). FIG. 7 shows an example of magnetic disk device in the third embodiment, where the number of steps m to be pre-read is two. Also, FIG. 7 illustrates an operation thereof at time kT(k=0,1,2 . . . n), where the sampling time in the digital control system is T.

In the third embodiment, until when a head position P(kT)101 reaches ½ track width before a final positioning target position, the head position is moved near the final position by speed control. Namely, a position draw speed reference track generating means 501 stores a reference speed track table which is defined as a function of the remaining distance from a head position P(kT)101 to the final target position and outputs a reference speed track 502 based on the remaining distance. A speed control servo compensating means 503 controls the estimated speed of the head 505 to follow the reference speed track 502 according to an error signal between the reference speed track 502 and the estimated speed of the head 505 estimated by a speed estimating means 504.

When the head position P(kT)101 reaches ½ track width before the final target position under speed control, the learning step is initialized to be k=0 and a switch 506 is switched from contact 1 to contact 2, then the pre-read learning means according to the invention is operated until the end of positioning. From this switching to the end of positioning, the head position P(kT)101 where the controlled system 301 is located is stabilized by controlling it in such a manner as to follow the reference position track Pr(kT)102 during the remaining part of the ½ track width generated by a reference position track generating means 202 within a controllable band of a servo compensating means 201 (in this case, the control band is sufficient for statical positioning, but it is not sufficient to control a transient characteristic in positioning with a common characteristic). For example, the servo compensating means 201 used herein comprises a phase compensator 203 for generating a feedback correcting signal 103 and a reverse model 204 to the controlled system which generates a feedforward signal 104 based on the reference position track Pr(kT)102.

After the switch 506 is switched from contact 1 to contact 2, a corrective control input storage and output means 205 outputs a corrective control input u(kT)105 which is renewed in a trial at the last time and is stored therein, as well as adding it to the feedback correcting signal 103 and feedforward signal 104, to the controlled system 301. On the other hand, to prepare for a positioning trial at the next time, a pre-read learning means 206 extracts a corrective control input u((k−2)T)106 which has already been output two steps before from the corrective control input storage and output means 205, and then it adds the corrective control input u((k−2)T)106 to a result 108 which is obtained by multiplying the position error e(kT)107 between the head position P(kT)101 observed at this time and the reference position track Pr(kT)102 by a constant learning gain λ110. Then, the added result is stored as a corrective control input u((k−2)T)109 to be output at timing (k−2)T in a trial at the next time into the corrective control input storage and output means 205. As seen from the above explanation, in two sample times of k=0,1, the output of corrective control input is conducted, but the renewal operation is not conducted since the corrective control input u((k−2)T)106 to be renewed does not exist at the sample times k=0 and 1. In addition, since the completing speed of the learning in this embodiment increases with the increase in the value of learning gain λ110, a large gain is used in the beginning of learning where a faster completing speed of learning is required, and the value of learning gain α 110 is controlled to be small when the result of learning attains to some degree. Therefore, an oversensitive learning reaction can be suppressed near the end of learning where a sudden position error does not happen and a gradual change such as a variation with time can be effectively corrected.

By repeating such positioning trials, to match with the characteristic of the controlled system 301 while the learning is repeated, the position error e(kT)107 between the head position P(kT)101 and the reference position track Pr(kT) 102 can approach zero. Furthermore, since the start timing of learning is defined by the position P(kT)101 of the controlled system, the dispersion in the state of the controlled system is small at the start of learning and a common corrective control input can be used in the case of different positioning distances. In this embodiment, the position error which is intended to approach zero by the corrective control input u(kT)105 is e((k+2)T) (i.e., two steps after). Therefore, as compared with the conventional manner in which the renewal of the corrective learning input is simultaneously conducted with the output of the trial at the next time, the present method has a grace period of two sample times for the correction to take place. As a result, the occurrence of a spike-shaped corrective control input can be suppressed. Furthermore, even when the sampling time is long and the control band of the feedback servo control is narrow, a high-speed positioning can be performed while providing a common characteristic to adapt to dispersion characteristics in the controlled system and the variation with time, to all target positions and in all kinds of devices.

Although the invention has been described with respect to specific embodiments for a complete and clear disclosure, the appended claims are not to be thus limited but are to be construed as embodying all modification and alternative constructions that may occur to one skilled in the art which fairly fall within the basic teaching herein set forth.

What is claimed is:

1. A pre-read learning digital servo-control device, comprising:

a digital servo-control means for positioning a controlled object;

a reference position track generating means for generating a reference position;

a servo compensating means for controlling said controlled object in accordance with said reference position;

a pre-read learning means for updating a corrective control input, said corrective control input based on a position error between said reference position and said position of said controlled object in a n-th trial for positioning in said controlled object; and a corrective control input storage and output means for storing said updated corrective control input, and for outputting said updated corrective control input to said digital servo-control means in said (n+1)-th trial for positioning said controlled object at m sample time(s) before the corresponding time when a subsequent updated corrective control input is stored in said (n+1)-th trial.

2. A pre-read learning digital servo-control device, according to claim 1, wherein:

said pre-read learning means and said corrective control input storage and output means operate from a time when either of said reference position and said position of said controlled object reaches a predetermined position before a final target position to the end of positioning.

3. A pre-read learning digital servo-control device, comprising:

a digital servo-control means for controlling speed of a controlled object;

a reference speed track generating means for generating a reference speed;

a servo compensating for controlling said controlled object in accordance with said reference speed;

a pre-read learning means for updating a corrective control input, said corrective control input based on a speed error between said reference speed and said speed of said controlled object observed in a n-th trial for speed control; and a corrective control input storage and output means for storing said updated corrective control input, and for outputting said updated corrective control input to said digital servo-control means in said (n+1)-th trial at m sample time(s) before the corresponding time when a subsequent updated corrective control input is stored in said (n+1)-th trial for speed control.

4. A pre-read learning digital servo-control device, according to claim 3, wherein:

said pre-read learning means and said corrective control input storage and output means operate from a time when either of said reference speed and said speed of said controlled object attains to a predetermined speed before a final target speed to when said speed of said controlled object approaches said final target speed.

5. A pre-read learning digital servo-control device, according to claim 1, wherein:

a corrective control input storage and output means comprises a non-volatile storage which retains said updated corrective control input even after operation of said digital servo-control means is terminated, and said updated corrective control input retained therein is used as an initial value when said digital servo-control means is activated again.

6. A pre-read learning digital servo-control device, according to claim 3, wherein:

a corrective control input storage and output means comprises a non-volatile storage which retains said updated corrective control input even after operation of said digital servo-control means is terminated, and said updated corrective control input retained therein is used as an initial value when said digital servo-control means is activated again.

* * * * *